United States Patent [19]

Kaneyuki

[11] Patent Number: 4,843,267
[45] Date of Patent: Jun. 27, 1989

[54] CHARGING GENERATOR

[75] Inventor: Kazutoshi Kaneyuki, Hyogo, Japan

[73] Assignee: Mitsubishi Denki Kabushiki Kaisha, Tokyo, Japan

[21] Appl. No.: 293,038

[22] Filed: Jan. 3, 1989

[30] Foreign Application Priority Data

Jan. 21, 1988 [JP] Japan ................................ 62-6462[U]

[51] Int. Cl.⁴ ........................................... H02K 11/00
[52] U.S. Cl. .................................... 310/68 D; 310/71; 363/145
[58] Field of Search ...................... 310/68 D, 68 C, 71; 363/145, 144

[56] References Cited

U.S. PATENT DOCUMENTS 4,100,440  7/1978  Binder ............................... 310/68 D
4,712,029  12/1987  Nold ...................................... 310/71

FOREIGN PATENT DOCUMENTS 199504  10/1986  European Pat. Off. ............... 310/71
171454  10/1961  Japan .
149253  9/1962  Japan .
56-19353  2/1981  Japan ...................................... 310/71

Primary Examiner—Patrick R. Salce
Assistant Examiner—Tien M. Nguyen
Attorney, Agent, or Firm—Sughrue, Mion, Zinn, Macpeak and Seas

[57] ABSTRACT

A charging generator having a rectifier within a casing and an output terminal which is connected to the rectifier and projects radially with respect to a rotary shaft comprises: a terminal screw having a threaded shaft portion which constitutes the output terminal, a mounting arm portion formed integral with the threaded shaft portion, and a mounting bore provided in the mounting arm portion, the central axis of the mounting bore extending parallel with the axis of the threaded shaft portion; an output terminal base made of an insulating resin material which covers the mounting arm portion in such a manner that the mounting bore is not closed therewith, the base being formed integral with the terminal screw; an opening formed in the casing at a position which faces the rectifier so as to accommodate the output terminal base; and a screw inserted through the mounting bore in the terminal screw to connect the terminal screw, together with the output terminal base, to the rectifier. Accordingly, it is possible to assemble, disassemble and reassemble the output terminal lead-out section after the generator body has been assembled and it is also possible to ensure high rigidity, provide firm and reliable electrical connections and reduce the overall size and production cost.

9 Claims, 4 Drawing Sheets

CHARGING GENERATOR

BACKGROUND OF THE INVENTION
1. Field of the Invention

The present invention relates to a charging generator and, more particularly, to an improvement in the section for leading out an output terminal in a charging generator for use in a vehicle.

2. Description of the Related Art

Conventional charging generators of the type described above are disclosed in Japanese Utility Model Public Disclosure (Kokai) Nos. 61-171454 (1986), 61-41365 (1986) and b 62-149253 (1987). FIG. 4 shows the arrangement of the charging generator disclosed in Japanese Utility Model Public Disclosure (Kokai) No. 61-171454 (1986), while FIG. 5 shows the arrangement of the charging generators disclosed in Japanese Utility Model Public Disclosure (Kokai) Nos. 61-41365 (1986) and 62-149253 (1987). In FIGS. 4 and 5, the reference numeral 1 denotes a cup-shaped rear bracket, 2 a cup-shaped front bracket, 3 a rotary shaft which is supported through bearings 4 and 5 which are secured to the brackets 1 and 2, respectively, 6 a rotor, 7 a field coil, 8 a stator, 9a a front coil end, 9b a rear coil end, 10a a front centrifugal fan, 10b a rear centrifugal fan, 11 a brush holder, 12 a regulator, and 13 a heat sink of a rectifier.

In the output terminal lead-out section of the conventional charging genrator shown in FIG. 4, an axial output terminal 14 which is connected to the heat sink 13 of the rectifier is disposed so as to project axially outward from the side wall of the rear bracket 1 and rigidly secured together with an output terminal 16 by means of a nut 15. The output terminal 16 is extended radially along the outer periphery of the rear bracket 1 and the distal end portion of the output terminal 16 is projected in a direction which is substantially perpendicular to the axis of the rotary shaft 3 so that it is used to constitute a threaded portion 17. It should be noted that the output terminal 16 is covered with a resin material 18 in order to isolate the bracket 1 from the outside.

The output terminal lead-out section in the conventional charging generator shown in FIG. 5 is comprised of a connecting member 19 having one end thereof secured to the heat sink 13 of the rectifier and the other end thereof bent so as to extend axially and an output terminal bolt 20 which is in thread engagement with a threaded bore 19a provided in the second end portion of the connecting member 19 so as to extend perpendicular to the axis of the rotary shaft 3, the distal end portion of the bolt 20 projecting outward from the rear bracket 1.

As described above, it has been considered preferable to arrange the output terminal lead-out section of a charging generator such that the output terminal projects radially from the viewpoint of the space required to mount the generator on an engine, the arrangement of wirings and the efficiency of the mounting operation. The arrangement of the output terminal lead-out section is demanded to satisfy the following requirements:

(1) Since the output terminal which projects radially will interfere with the operation of automatically assembling the body of the charging generator, it must be capable of being mounted after the generator body has been assembled.

(2) It is necessary to minimize the number of required changes or modifications of the parts constituting the axial output terminal and the parts constituting the generator body.

(3) The terminal screw must be reliably locked from turning and the terminal base must have a satisfactorily high rigidity.

(4) The dimensional accuracy which is required to combine together the generator body and the terminal must be less rigorous.

(5) The contact resistance between the respective portions of the generator body and the terminal which are electrically connected together must be low.

(6) The production cost must be low and the overall size must be small.

The conventional charging generator shown in FIG. 4 suffers, however, from many problems. Since the electrically connected portion of the output terminal base needs knurling, it is necessary to mount the output terminal lead-out section in the process of assembling the generator body. Moreover, it is impossible to disassemble and reassemble the output terminal lead-out section. Further, since the distance from that portion of the terminal which is rigidly secured to the generator body to the threaded end portion of the terminal is long, the rigidity is low. In addition, the axial length is disadvantageously long, and since it is necessary to employ a split mold which consists of three mold members as a mold for forming the terminal base from a resin material, the production cost is increased.

The conventional charging generator shown in FIG. 5 also suffers from the following problems. When the external wiring is attached to or detached from the output terminal bolt, the bolt may be undesirably turned together with the wiring attachment which is screwed thereonto and therefore the thread engagement portions which are provided inside are likely to become loose. Further, since the structure is such that the output terminal bolt is in thread engagement with the connecting member or the heat sink with the circumferential wall of the bracket clamped therebetween, high positional accuracy is needed and it is also necessary to minimize the draft for the bracket which is generally made of an aluminum die casting alloy or it is necessary to machine the surface of the bracket to which the output terminal bolt is secured.

SUMMARY OF THE INVENTION

In view of the above-described problems of the prior art, it is a primary object of the present invention to provide a charging generator which is designed so that it is possible to assemble, disassemble and reassemble the output terminal lead-out section after the generator body has been assembled and it is also possible to ensure high rigidity, provide firm and reliable electrical connections and reduce the overall size and production cost.

To this end, the present invention provides a charging generator having a rectifier within a casing and an output terminal which is connected to the rectifier and projects radially with respect to a rotary shaft, comprising: a terminal screw having a threaded shaft portion which constitutes the output terminal, a mounting arm portion formed integral with the threaded shaft portion, and a mounting bore provided in the mounting arm portion, the central axis of the mounting bore extending parallel with the axis of the threaded shaft portion; an output terminal base made of an insulating resin material which covers the mounting arm portion in such a manner that the mounting bore is not closed therewith, the base being formed integral with the terminal screw; an opening formed in the casing at a positon which faces the rectifier so as to accommodate the output terminal screw; an opening forrmed in the casing at a position which faces the rectifier so as to accommodate the output terminal base; and a screw inserted through the mounting bore in the terminal screw to connect the terminal screw, together with the output terminal base, to the rectifier.

By virtue of the above-described arrangement of the present invention, the output terminal lead-out section is assembled after the charging generator body has been assembled in such a manner that the output terminal base is disposed in the opening provided in the casing and the terminal screw, together with the output terminal base, is rigidly secured to the rectifier by means of the screw which is inserted through the mounting bore formed in the mounting arm portion of the terminal screw.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements and, of which.

DESCRIPTION OF THE PREFERRED EMBODIMENT;

The charging generator according to the present invention will be described hereinunder in more detail by way of one embodiment and with reference to the accompanying drawings.

Figure 1:
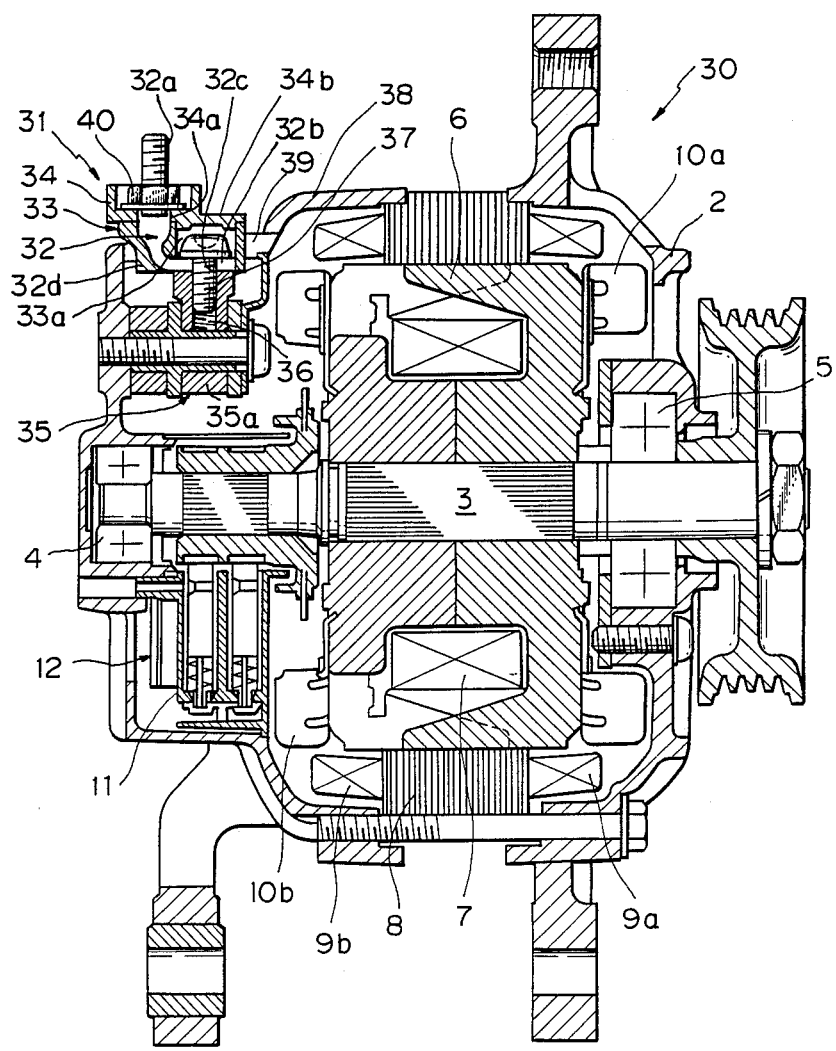
FIG. 1 is a sectional view of one embodiment of the charging generator according to the present invention.
Figure 3:
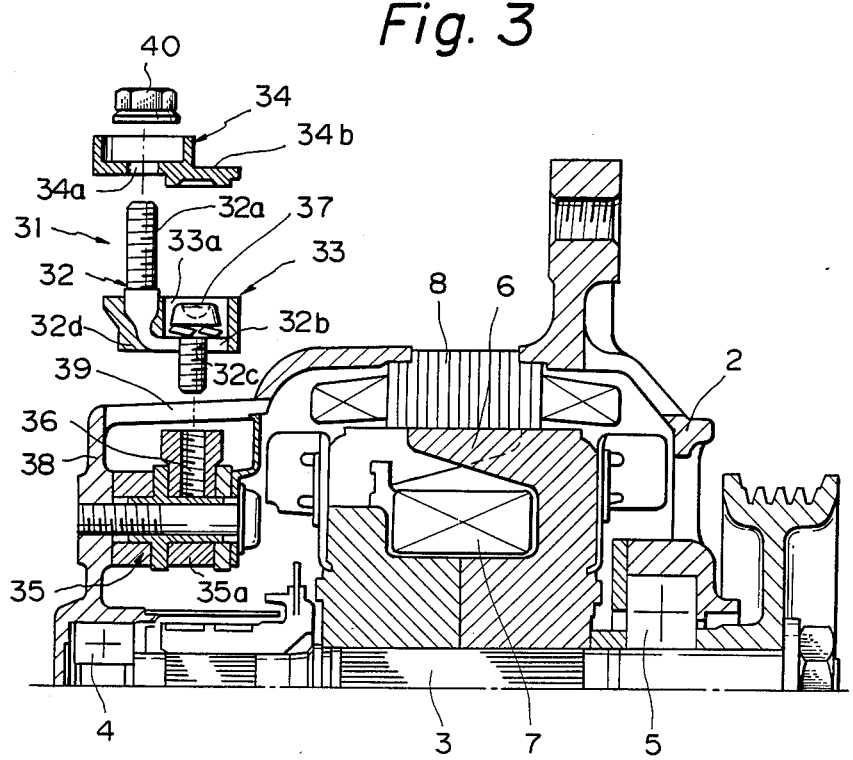
FIG. 3 is a fragmentary sectional view of the charging generator, which shows the way in which the output terminal lead-out section is assembled.
Figure 2:
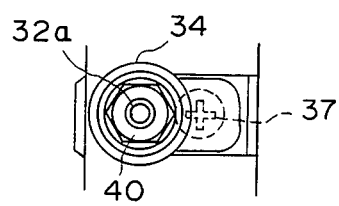
FIG. 2 is a fragmentary plan view of the output terminal lead-out section of the charging generator shown in FIG. 1.
Figure 4:
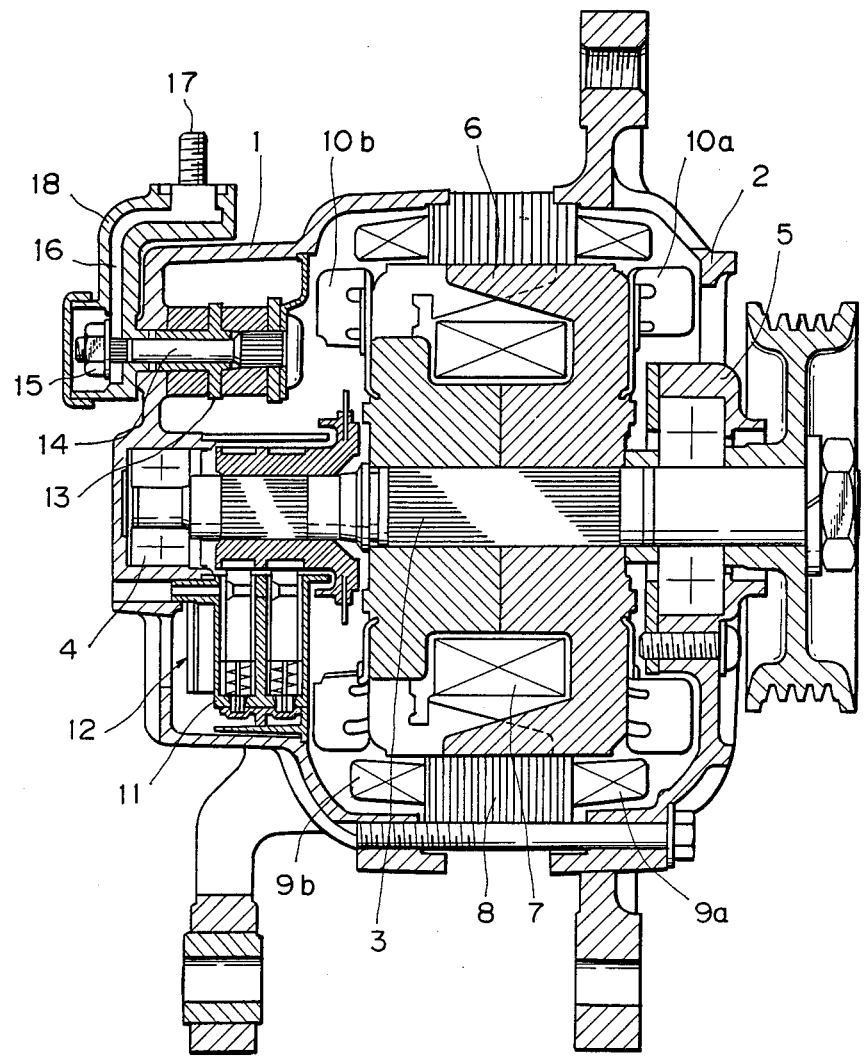
FIG. 4 is a sectional view of a conventional charging generator.
Figure 5:
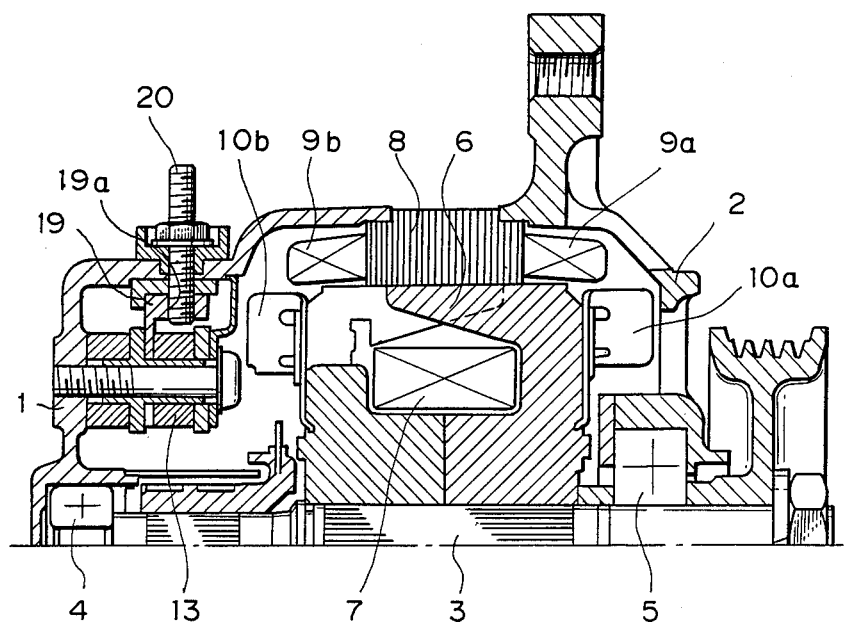
FIG. 5 is a fragmentary sectional view of another conventional charging generator.

FIGS. 1 to 3 show in combination one embodiment of the charging generator according to the present invention. In FIGS. 1 to 3, the members or portions which are identical or equivalent to those which constitute the conventional charging generators shown in FIGS. 4 and 5 are denoted by the same reference numerals and description thereof is omitted.

In the charging generator 30 according to this embodiment, the output terminal lead-out section 31 includes a terminal screw 32 having a threaded shaft portion 32a which constitutes an output terminal and a mounting arm portion 32b which is provided with a mounting bore 32c the axis of which extends parallel with the axis of the threaded shaft portion 32a. Accordingly, the mounting arm portion 32b extends perpendicular to the threaded shaft portion 32a the terminal screw 32 has an L-shaped cross-sectional configuration. The terminal screw 32 is covered with an insulating resin material 32d except for the threaded shaft portion 32a by insert molding process, thus constituting an output terminal base 33 as a whole. A cap member 34 which is made of an insulating resin material is attached to that side of the output terminal base 33 which is closer to the threaded shaft portion 32a. The cap member 34 has a bore 34a which receives the threaded shaft portion 32a. The cap member 34 further has a cover portion 34b which closes a recess 33a defined by the insulating resin material 32d so as to surround the mounting bore 32c provided in the mounting arm portion 32b.

On the other hand, the boss of a positive pole-side heat sink 35a of a rectifier 35 is provided with a radial threaded bore 36 so that a screw 37 which is inserted through the mounting bore 32c in the mounting arm portion 32b of the output terminal base 33 is screwed into the threaded bore 36, thereby rigidly securing the output terminal base 33 which is disposed within a substantially rectangular opening 39 formed in the circumferential wall of a rear bracket 38 by a method that employs a core pin or other similar means.

To assemble the output terminal lead-out section 31 having the above-described arrangement, the screw 37 is first inserted into the mounting bore 32c in the mounting arm portion 32b from the recess 33a in the output terminal base 33, as shown in FIG. 3, and the output terminal base 33 is positioned within the opening 39 in the rear bracket 38 and then the screw 37 is screwed into the threaded bore 36 in the boss of the heat sink 35a, thereby rigidly securing the output terminal base 33. Next, the cap member 34 is attached in such a manner that the threaded shaft portion 32a of the output terminal base 33 is passed through the bore 34a and the cover portion 34b closes the recess 33a in the output terminal base 33. Thereafter, the cap member 34 is rigidly secured to the output terminal base 33 by means of a nut 40 which is screwed onto the threaded shaft portion 32a.

It should be noted that, although in the foregoing embodiment the threaded bore 36 is provided directly in the boss of the heat sink 35a of the rectifier 35, it is also possible to provide a threaded bore in a connecting member or the like which is rigidly secured to the heat sink 35a. Further, the output terminal base 33 may be secured to an externally threaded member or portion which projects from the heat sink 35a using a nut.

As will be clear from the foregoing description, the present invention provides the following various practical advantages. Namely, it is possible to assemble the output terminal lead-out section after the assembly of the charging generator body and it is also easy to disassemble and reassemble the output terminal lead-out section. Since the distance from that portion of the output terminal base which is rigidly secured to the generator body to the threaded shaft portion is short, the rigidity is satisfactorily high. There is no fear of the terminal screw being undesirably turned when an external wiring is attached thereto or detached therefrom, so that it is possible to provide firm and reliable electrical connections. The charging generator according to the present invention has a reduced size and requires less rigorous positional accuracy when the output terminal base is mounted on the generator body. Further, since the output terminal base can be formed with a split mold which consists of two mold members, the production cost is low. In addition, since the screw which is used to secure the output terminal base is completely insulated by means of the resin portion of the terminal base and the cap member. the electrical insulation is reliable and achieved at low cost.

Although the present invention has been described through specific terms, it should be noted that the described embodiment is not necessarily exclusive and various changes and modifications may be imparted thereto without departing from the scope of the invention which is limited solely by the appended claims.

What is claimed is:

1. A charging generator having a rectifier within a casing and an output terminal which is connected to said rectifier and projects radially with respect to a rotary shaft, comprising:

a terminal screw having a threaded shaft portion which constitutes said output terminal, a mounting arm portion formed integral with said threaded shaft portion, and a mounting bore provided in said mounting arm portion, the central axis of said mounting bore extending parallel with the axis of said threaded shaft portion;

an output terminal base made of an insulating resin material which covers said mounting arm portion in such a manner that said mounting bore is not closed therewith, said base being formed integral with said terminal screw;

an opening formed in said casing at a position which faces said rectifier so as to accommodate said output terminal base; and a screw inserted through said mounting bore in said terminal screw to connect said terminal screw, together with said output terminal base, to said rectifier.

2. A charging generator according to claim 1, wherein said output terminal base is formed on said mounting arm portion of said terminal screw by insert molding process.

3. A charging generator according to claim 1, wherein a threaded bore is provided in the boss of said rectifier, said threaded bore extending toward said opening, so that said screw is screwed into said threaded bore to secure said output terminal base.

4. A charging generator according to claim 1, wherein said mounting arm portion of said terminal screw is bent so as to extend in a direction perpendicular to the axis of said threaded shaft portion, said mounting bore being provided in that portion of said mounting arm portion which extends perpendicular to the axis of said threaded shaft portion.

5. A charging generator according to claim 1, wherein the upper surface of said output terminal base is provided with a recess which is communicated with said mounting bore, so that, when said output terminal base is secured, the head of said screw is accommodated within said recess.

6. A charging generator according to claim 5, further comprising a cap member having a bore for receiving said threaded shaft portion of said terminal screw and a cover portion which is fitted into said recess provided in said output terminal base, said cap member being rigidly secured to said output terminal base by means of a nut which is screwed onto said threaded shaft portion.

7. A charging generator according to claim 1, wherein said opening is provided in a rear bracket.

8. A charging generator according to claim 1, wherein said rotary shaft is rotatably supported through two bearings which are secured to front and rear brackets, respectively.

9. A charging generator according to claim 7, wherein said rectifier is rigidly secured to the inner surface of said rear bracket by means of a bolt.

* * * * *